(No Model.)

J. GWYNNE.
PORTABLE STEAM PUMPING ENGINE.

No. 326,642. Patented Sept. 22, 1885.

Witnesses:
Jos. H. Blackwood.
R. G. Du Bois

Inventor:
John Gwynne
by M. W. Doolittle
Attorney.

(No Model.) 6 Sheets—Sheet 2.

J. GWYNNE.
PORTABLE STEAM PUMPING ENGINE.

No. 326,642. Patented Sept. 22, 1885.

Witnesses:
Jos. H. Blackwood.
R. G. Du Bois.

Inventor:
John Gwynne
by M. Doolittle
Attorney (No Model.) 6 Sheets—Sheet 3.
J. GWYNNE.
PORTABLE STEAM PUMPING ENGINE.

No. 326,642. Patented Sept. 22, 1885.

(No Model.)

6 Sheets—Sheet 4.

J. GWYNNE.
PORTABLE STEAM PUMPING ENGINE.

No. 326,642. Patented Sept. 22, 1885.

Witnesses:
Jos. H. Blackwood.
R. G. Du Bois.

Inventor:
John Gwynne
by W. H. Doolittle
Attorney (No Model.) 6 Sheets—Sheet 6.

J. GWYNNE.
PORTABLE STEAM PUMPING ENGINE.

No. 326,642. Patented Sept. 22, 1885.

Witnesses;
Jos. H. Blackwood
R. J. Du Bois

Inventor;
John Gwynne
by W. H. Doolittle
Attorney

UNITED STATES PATENT OFFICE.

JOHN GWYNNE, OF LONDON, ENGLAND.

PORTABLE STEAM PUMPING-ENGINE.

SPECIFICATION forming part of Letters Patent No. 326,642, dated September 22, 1885.

Application filed April 1, 1885. (No model.) Patented in England April 10, 1884, No. 6,266, and in France May 26, 1884, No. 162,348.

*To all whom it may concern:*

Be it known that I, JOHN GWYNNE, a subject of the Queen of Great Britain and Ireland, residing at the city of London, Kingdom of Great Britain and Ireland, have invented new and useful Improvements in Portable Steam Pumping-Engines, (for which I have obtained a patent in France, No. 162,348, bearing date May 26, 1884,) of which the following is a specification.

The object of this invention is to produce a simple, compact, light, and convenient arrangement of portable steam pumping-engine so arranged that the pump-case can be swiveled so as to adjust the portion of the inlet from time to time to suit circumstances, as described in the specification of my application for Letters Patent of the United States filed April 1, 1885, No. 160,898.

My present invention has reference, chiefly, to the arrangement of the steam-engine proper, and the centrifugal pump with regard to the boiler, which is of the locomotive tubular type, mounted on four traveling wheels, with or without springs, as may be required.

Figure 1:
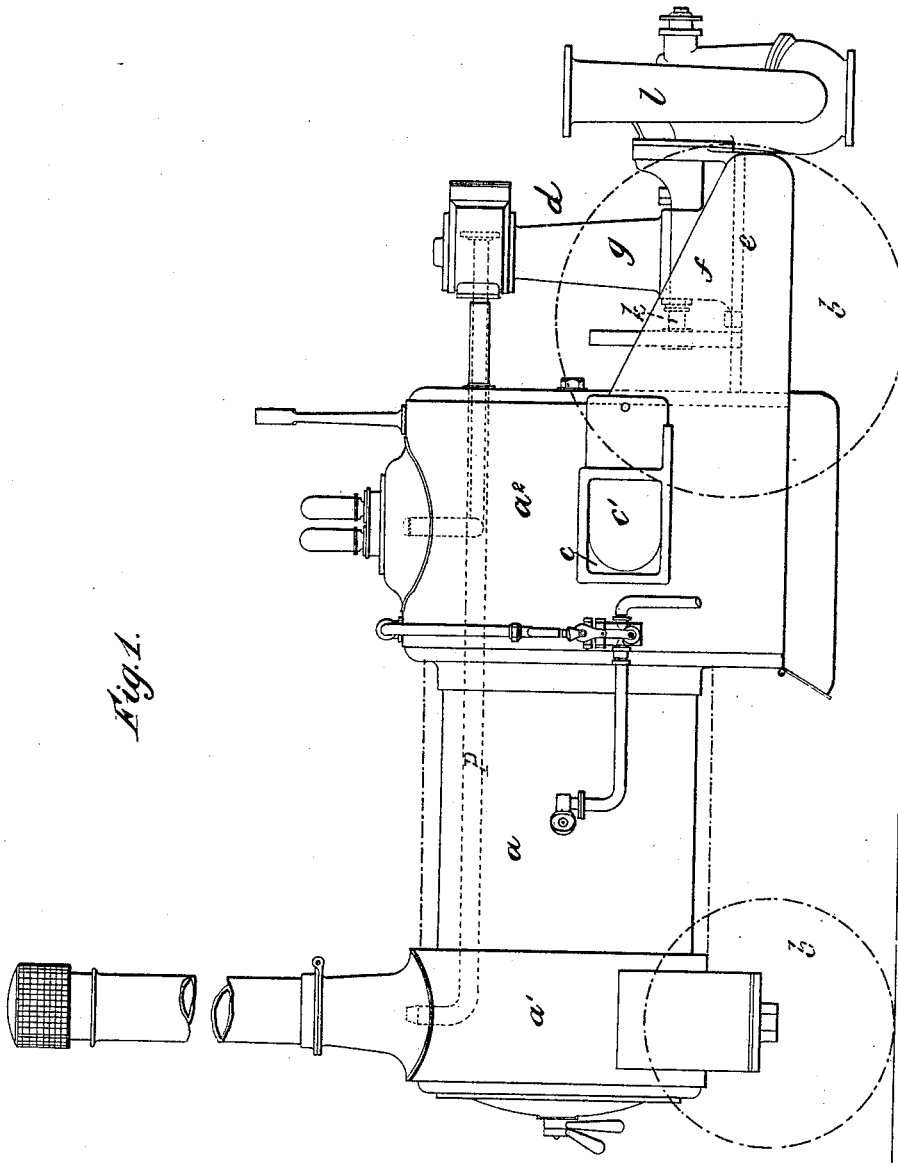
Figure 2:
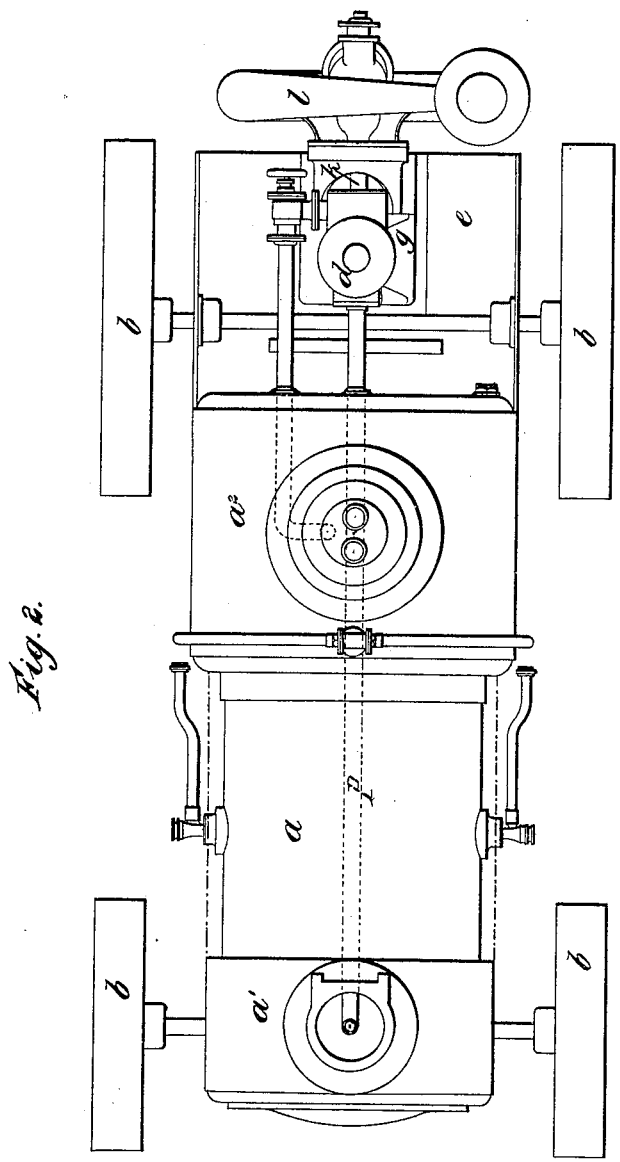
Figure 3:
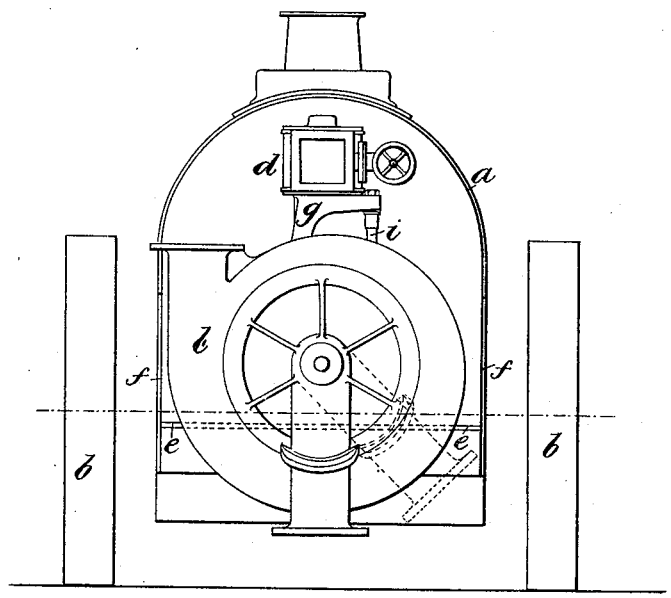

In the accompanying illustrative drawings, Figure 1 shows in side elevation the general arrangement of a portable pumping-engine according to my invention, and Fig. 2 is a plan or top view of the same. Fig. 3 is an elevation showing the fire-box end of the engine with its centrifugal pump.

$a$ is the boiler, mounted on the carrying-wheels $b$. The front axle of one pair of the wheels is placed, as usual, under the smoke-box $a'$; but the hind axle of the other pair is placed at the rear end of the fire-box $a^2$, so as to support the weight of the machinery more equally, and also that the hind wheels may nearly clear the sides of the fire-box, so as to afford ready access to the fire-door opening $c$, which is formed in one side of the fire-box, and is provided with a sliding door, $c'$, in lieu of the usual hinged door.

The engine proper, $d$, is of the vertical type, and in the example shown is of the inverted-cylinder steeple kind. It is fixed behind the fire-box, being placed on a platform, $e$, which projects from the fire-box end of the boiler, and is supported by girders or by brackets $f$, which may be of wrought-iron. These brackets may be riveted to the sides of the fire-box, or may be formed by extending the side plates of the fire-box and converting the extensions of these side plates into brackets, the platform being fixed to these brackets by riveting or otherwise. The platform carries the engine proper, and sometimes also the pump, when it is arranged independently of the boiler, so that no trouble shall arise from unequal expansion or contraction.

The engine proper, $d$, is constructed with a hollow segmental back frame, $g$, and a wrought-iron stanchion, $h$, to support the cylinder $i$ in front. A slipper-guide is used. The frame is fixed to the platform at the base, and the crank-shaft $k$ is carried in suitable bearings, which can be fixed either on the platform or on the base of the engine.

The engine proper, $d$, and the centrifugal pump $l$ are fixed on the same base-piece, with the axis of their common shaft $k$ running parallel with the longitudinal axis of the boiler. This arrangement allows the pump to be placed well aft, so that full advantage can be taken of my swivel construction of centrifugal pump described in the specification of my other application for Letters Patent, already mentioned, according to which the pump-case can be swiveled so as to adjust the angle of the inlet and outlet as may be required from time to time.

Figure 4:
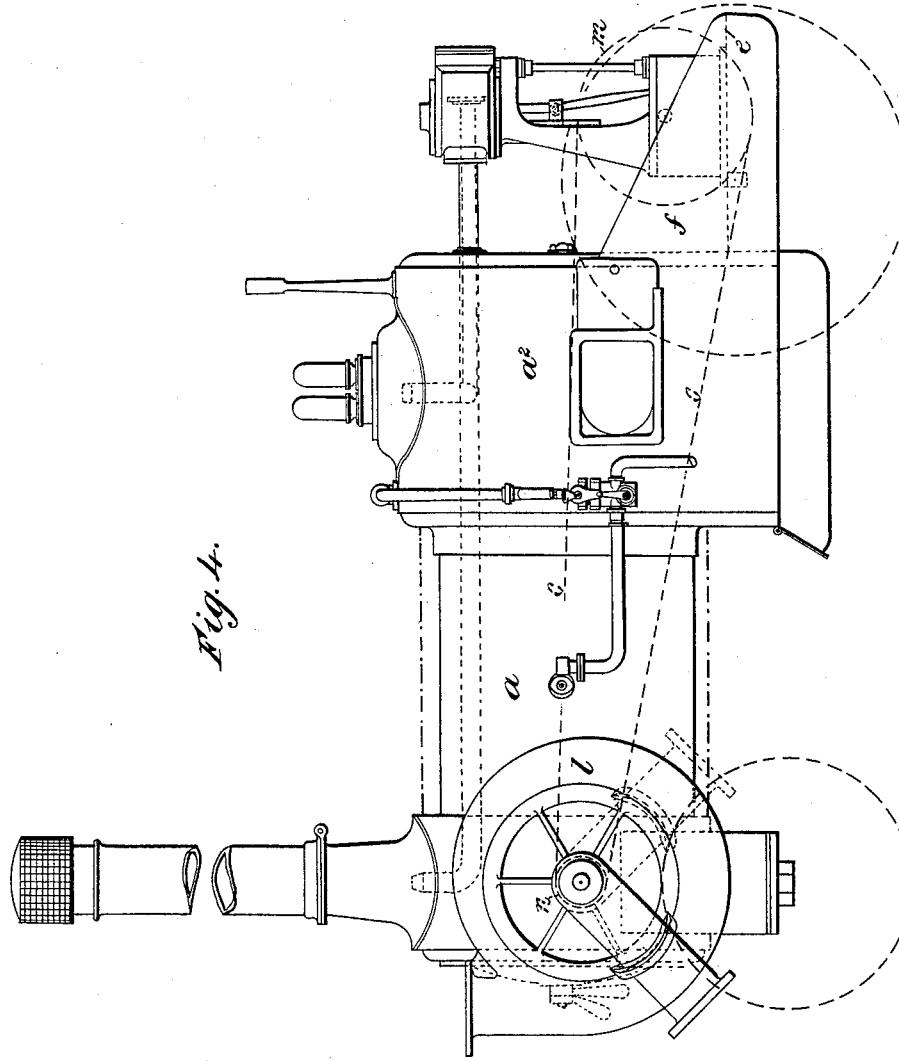

The modification whereof Fig. 4 is a side view is adapted for use in those cases where it is desired to drive the centrifugal pump by means of a belt. In this case the engine proper is still placed on a platform, $e$, supported at the rear of the boiler by brackets $f$, but with the crank-axis at right angles with the longitudinal axis of the boiler, and the fly-wheel or driving-drum $m$ projects on one side, so as to clear the side of the platform. The pump $l$ in this case is carried on a bracket at the smoke-box end of the boiler, or it may be fixed to the center of the fore carriage. In the example illustrated the pump is at the side of the smoke-box, but it may be in front of the smoke-box. The driving-shaft of the pump is disposed parallel to the crank-shaft of the engine, and its driving-drum $n$ projects on one side of the boiler, so as to be in a line with the drum $m$ on the crank-shaft of the engine, and to be driven therefrom by a belt, $o$.

Figure 5:
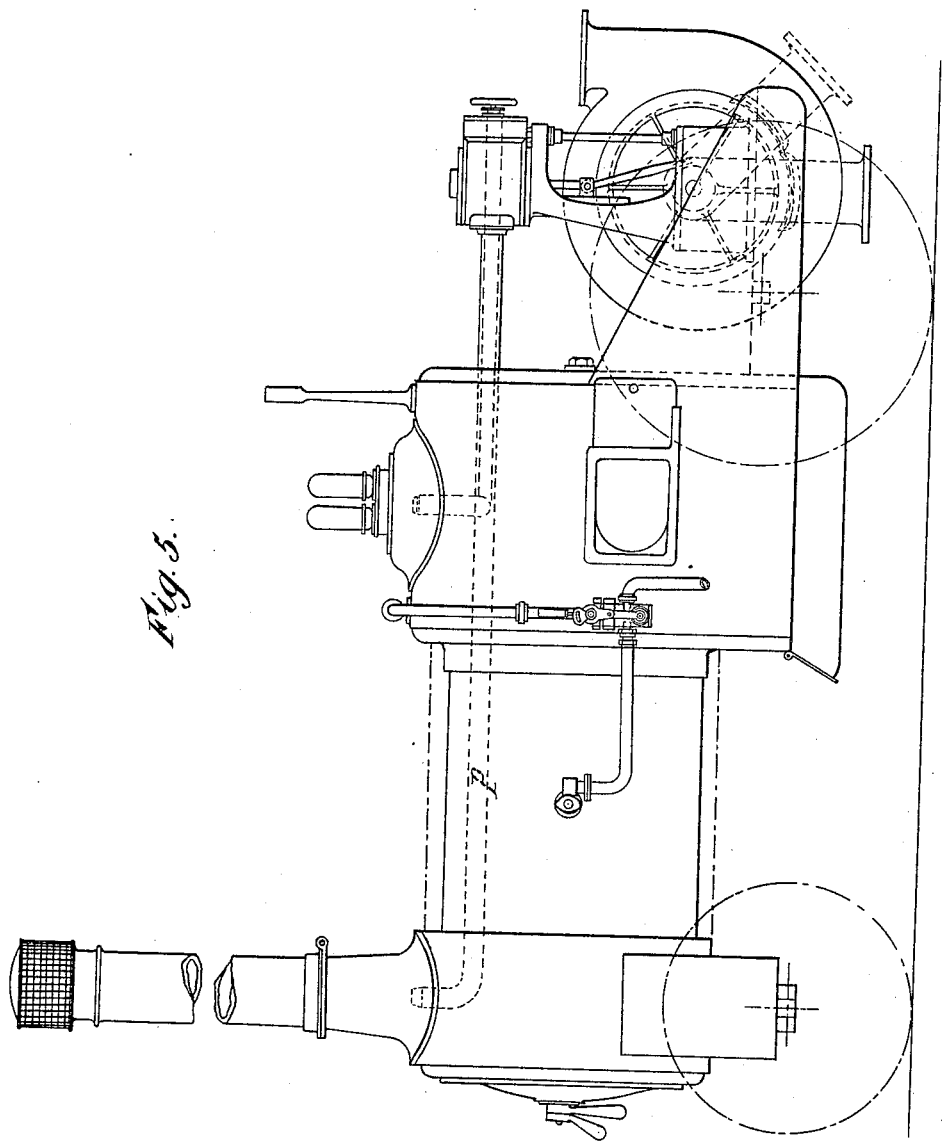
Figure 6:
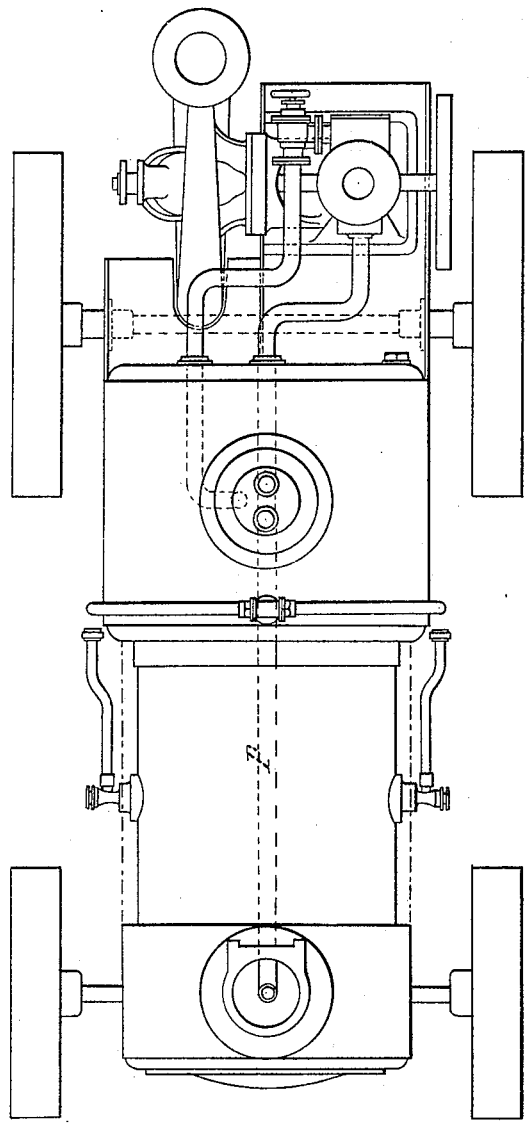

The arrangement of the bearings is such as to allow of swiveling the pump to a sufficient extent for all practical purposes. In the last-described arrangement the engine can be used for various other purposes. In the further modification illustrated in Figs. 5 and 6 the crank-shaft of the engine is also the shaft of the centrifugal pump $l$, which in this case is situate at the side of the platform. $p$ is the steam-exhaust pipe in each arrangement.

What I claim is—

1. A portable steam pumping-engine provided with a horizontal boiler of the locomotive tubular type and a fire-box and fire-door, in combination with a vertical engine and the platform on which said engine is supported, and a centrifugal pump centrally swiveled to a shaft and connected to said vertical engine by the driving mechanism, substantially as described.

2. A portable steam pumping-engine comprising a horizontal boiler, $a$, with fire-box $a^2$, and fire-door $c'$ at the side, platform or equivalent support $e$, vertical engine $d$ on said platform or equivalent support $e$ at the rear of the fire-box, and centrifugal pump $l$, the case of which is capable of being swiveled, all substantially as described.

JOHN GWYNNE.

Witnesses:
   W. LLOYD WISE,
     *Patent Agent, London,*
   G. FEREFELD,
     *Accountant Clerk, 89 Cannon Street.*